Figure 1A:
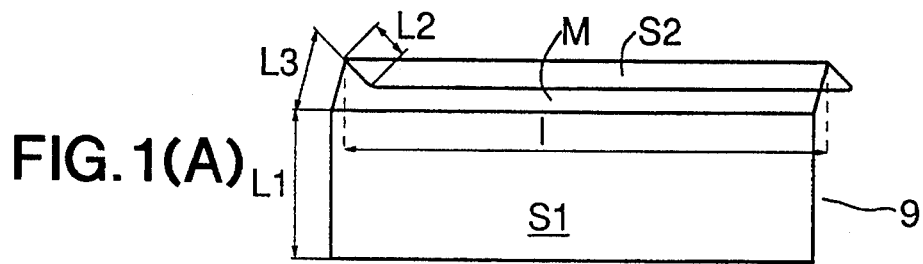

United States Patent [19]
Borck et al.

[11] Patent Number: 5,595,297
[45] Date of Patent: Jan. 21, 1997

[54] PROTECTIVE CONTAINER FOR SUBSTANTIALLY CUBOIDAL OBJECTS

[75] Inventors: Gerald-Wolfgang Borck, Ludwigshafen; Jochen Eicher, Neustadt, both of Germany; Pierre Kuhn, Schiltigheim, France; Norbert Müller, Friedelsheim, Germany; Antoine Salomé, Levallois Perret, France

[73] Assignee: BASF Magnetics GmbH, Mannheim, Germany

[21] Appl. No.: 155,147

[22] Filed: Nov. 22, 1993

[30] Foreign Application Priority Data

Nov. 27, 1992 [DE] Germany .............................. 9216154 U

[51] Int. Cl.⁶ ........................ B65D 85/672; B65D 43/16
[52] U.S. Cl. .................... 206/387.13; 206/387.11; 206/459.5; 206/807; 229/125.08; 229/125.19; 229/125.33
[58] Field of Search .................... 229/125.08, 125.19, 229/125.33; 206/387.11, 387.13, 459.5, 807

[56] References Cited

U.S. PATENT DOCUMENTS

| | | | |
|---|---|---|---|
| 1,298,635 | 4/1919 | Allen | 206/807 X |
| 1,586,447 | 5/1926 | James | 229/125.19 X |
| 1,819,933 | 8/1931 | Watson | 206/807 X |
| 4,125,189 | 11/1978 | Fujimoto et al. | 206/387.1 |
| 4,688,673 | 8/1987 | Yabe | 206/387.1 |
| 4,742,917 | 5/1988 | Bornwasser et al. | 229/125.19 X |
| 4,796,753 | 1/1989 | Fujii | 206/459.5 X |
| 4,921,562 | 5/1990 | Fujii | 206/459.5 X |
| 4,948,022 | 8/1990 | Van Dyke | 206/387.1 X |
| 4,978,009 | 12/1990 | Pany | 206/387.1 X |
| 4,998,985 | 3/1991 | Sankey | 206/387.1 |

*Primary Examiner*—Bryon P. Gehman
*Attorney, Agent, or Firm*—Keil & Weinkauf

[57] ABSTRACT

A protective container is provided for substantially cuboidal objects which is in the form of a hollow cuboid case which is open on one side. A case part is provided for covering the open side, the case part is U-shaped or partially U-shaped in this position. A closure arrangement is provided which connects the hollow cuboid case and the case part reveals when the container is opened for the first time. This container is especially well-suited for use with cassettes of all types, as well as other substantially cuboidal articles.

4 Claims, 4 Drawing Sheets

PROTECTIVE CONTAINER FOR SUBSTANTIALLY CUBOIDAL OBJECTS

The invention relates to a protective container for substantially cuboidal bodies, in particular cassettes, comprising a case of cuboid shape which has an open side for pushing in/taking out the body and bottom and top walls as well as long and short side walls, the open side of the case being covered by means of a separate case part.

A video cassette protective container with packaging is known, in which the cassette is contained in a hollow cuboid case which is open at one side. A wrapping card was used as a means of packaging to envelop the cassette along its longitudinal sides, so that its short width sides remain free. In the case, the cassette is closed off from the outside on the longitudinal side by the wrapping card. The various sides of the covering box serve for the provision of labels for the cassette and for notes on the content of the cassette. The length of the folded-open wrapping card corresponded to three times the width of the cassette plus two times the width of the narrow sides of the cassette. Moreover, the known protective container is also surrounded by a transparent film wrap as a further means of packaging.

It is an object of the present invention to provide a protective container for substantially cuboidal bodies, in particular cassettes, which is of a material-saving and environmentally friendly design.

We have found that this object is achieved by the protective container described at the beginning if the separate case part has in cross-section at least partially the shape of a U, at least in its covering position.

The object is also achieved at the same time if the separate case part has substantially the shape of a U over its length.

Consequently, with both ways of achieving the object, the body contained in the protective container is at least partially gripped around at the sides. Both ways achieve the effect of ensuring closure against dirt and dust with little expenditure on material.

In an expedient design, the folded-open length of the U-shape case part may correspond approximately to the width of the bottom or top wall of the case.

Consequently, pushing-in or placing-in of the flat case part is possible without protruding parts. It goes without saying that the flat case part may have space for notes.

DE-A-40 42 103 also discloses a video cassette case in which there is provided a closure tab which engages over the push-in opening, serves as an original closure, is connected to the side parts of the case and can be separated at least on one side by means of a point of weakness for removal of the cassette. The principal purpose of this case is to reduce expenditure on production and packaging, so that in the insert opening the rear side of the cassette is open without any covering, apart from the closure tab.

As described above, it is an object of the present invention to achieve a covering of the rear side of the cassette in a simple way, so that even in the case of an originality closure there is no need to dispense with the U-shape covering.

The case and the U-shape case part may advantageously be connected by means of at least one closure strip.

This accomplishes a closure of the protective container preventing falling-out of the cuboid body or unintentional opening. If the closure strip is a part which can be separated, in particular by means of a perforation, of the bottom or top wall, the same makes it possible to preserve the original state or the originality of the product located in the protective container, for example a cassette, until opening of the closure and, for example, separating of the closure part from the case, and makes it possible to indicate the loss of originality.

The closure strip may expediently fill or cover gripping clearances in the bottom and top walls of the case.

Consequently, a combined production of the closure strip, partially combined with a gripping clearance, is possible.

The closure strip may also be an at least partially adhesively attachable separate part of the packaging, for example an adhesive strip.

It is expedient and environmentally favorable if the case is produced from cardboard material with a coating of a printable dispersion varnish without metal particles, which in particular is water-soluble. The cardboard material may also be provided with a UV-varnish coating.

It goes without saying that this case may also consist only of unvarnished cardboard material and may also be provided with a layer of self-adhesive substance on one side, to be able to fulfil labeling purposes.

A separate adhesively attachable closure strip may also be arranged in a cutout of the U-shape case part.

It is favorable in terms of handling and production if the U-shape case has bevels in the folded-open position on the short sides, which facilitates the insertion and removal of the cuboid body.

For complete covering of the open container side, the U-shape case may have continuations on the part for the long open side wall of the container.

The configuration with an at least partial U-shape case part may be designed substantially in the form of a strip with lateral continuations for engaging in/covering over gripping clearances in the case walls. The ends of the strip may be configured additionally with continuations for the short side walls of the case.

Figure 1B:
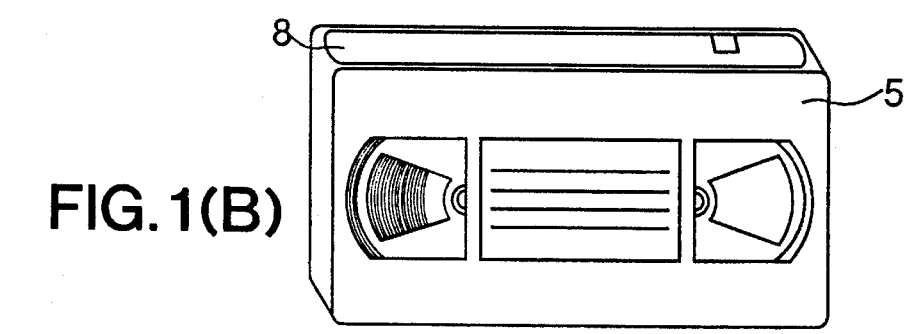
Figure 1C:
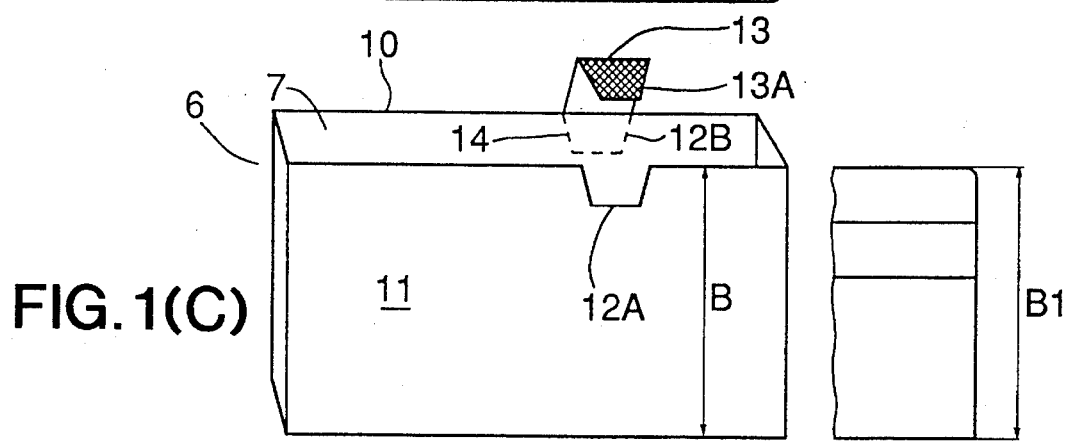
Figure 1D:
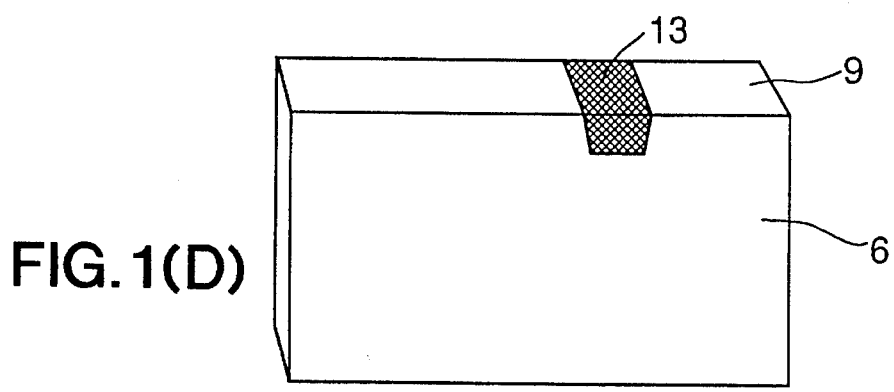
Figure 2A:
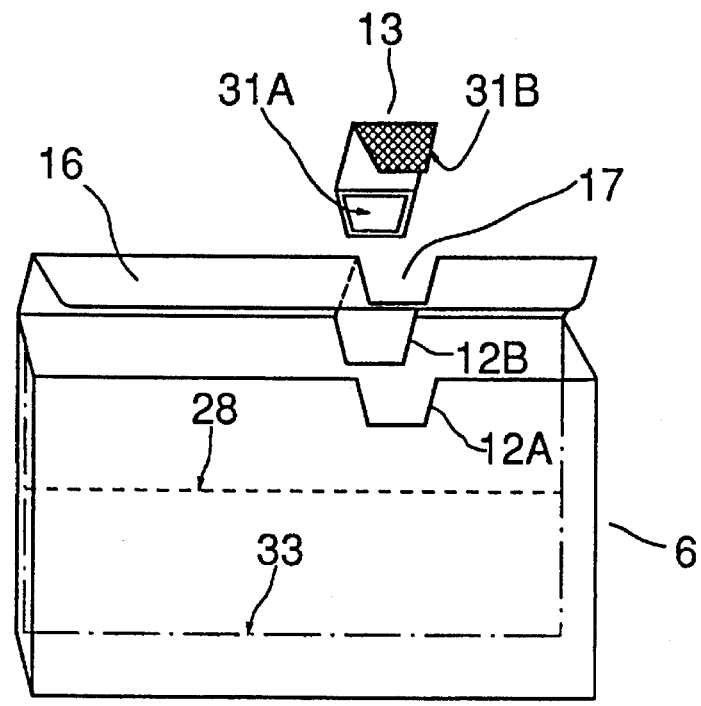
Figure 2B:
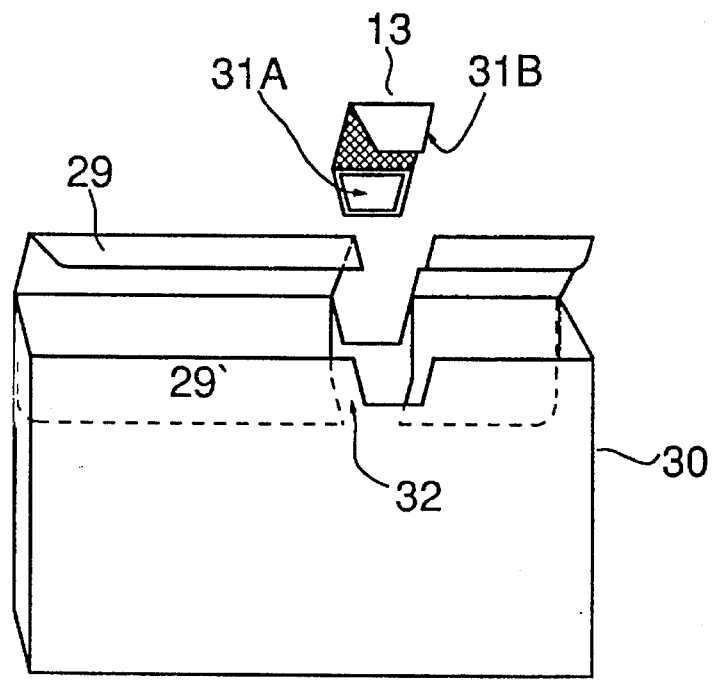
Figure 3:
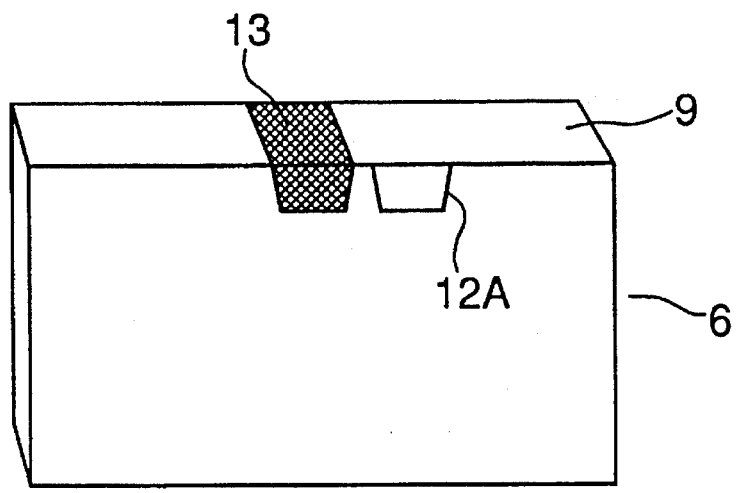
Figure 4:
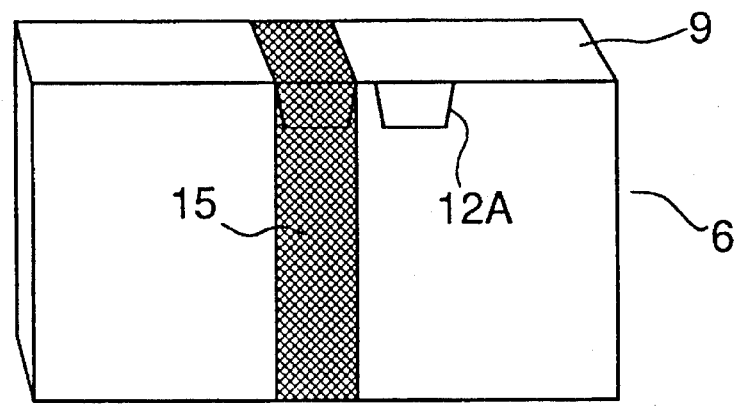
Figure 5:
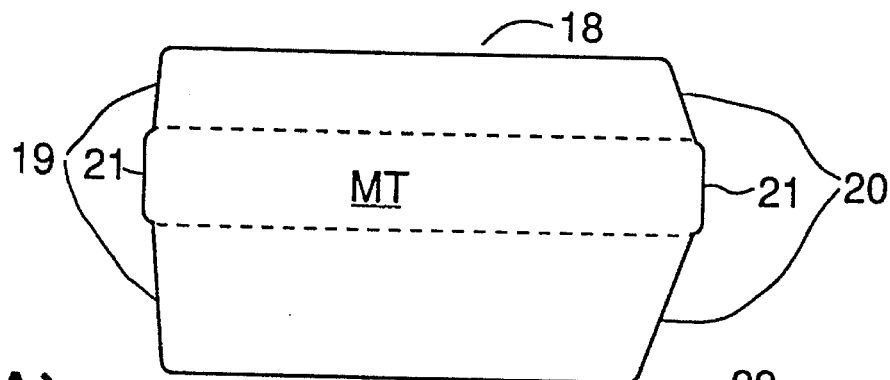

Exemplary embodiments of the invention are described below and are represented in the drawing, in which:

FIGS. 1A–1C show a video cassette with the protective container according to the invention in an exploded representation FIG. 1D shows the closed protective container according to FIGS. 1A and 1C FIGS. 2A and 2B show further versions of cassette protective container FIGS. 3 and 4 show further versions of the protective container according to FIG. 1D FIG. 5 shows a configuration of a U-shape case part folded into the plane FIGS. 6A–D show a further version of a protective case part according to the invention FIG. 1B shows a commercially available video cassette 5 as a substantially cuboidal body. A case 6 in FIG. 1C is of slightly larger cuboid shape and is designed with an open side 7. If the cassette 5 is located in the case 6, one longitudinal wall of the cassette, for example 8, is unprotectedly open. A U-shape case part 9 from FIG. 1A serves here as a covering, the side parts S1 and S2 being pushed between cassette 5 and the case bottom and top walls 10 and 11 and the longitudinal part M covering the open case side 7. In this covering position, the case part 9 has its cross-sectionally substantially U shape.

The side parts S1 and S2 expediently have the dimensions L1 and L2 and the central part has the dimension L3, the longitudinal extent 1 being chosen to correspond approximately to the length of the open case side 7, in order to ensure pushing-in and covering as described above. The sum of the dimensions L1+L2+L3 gives the width B1, which expediently corresponds approximately to the case width B, B1_B, it also being possible according to B1<B for B1 also to be less than B. A fraction of the U-shape case part 9 is represented in folded-open form in FIG. 1C. The purpose of this dimensioning is that the case part 9 can be placed in folded-open form into the case 6 as an insert sheet, for example for documentation of the cassette content. The case 6 is designed with two gripping cut-outs 12A and 12B lying opposite each other on the open side 7. In this example, the gripping cut-out 12B is closed by a closure strip 13, formed for example from the material of the case, which strip is connected by means of perforation 14 to the outline of the gripping cut-out. The front part 13A of the closure strip 13 may have on its rear side an adhesive substance, so that said strip can be adhesively attached for example into the gripping cut-out 12A, that is to say when the cassette 5 is pushed-in and the case part 9 is pushed-in it can be adhesively attached to the latter. After opening the adhesive bond and tearing out the strip 13 from the gripping cut-out 12B, reclosing is already no longer possible and the loss of originality of the packaged cassette 5 can be clearly recognized from this alone.

There may also be provided on both sides in the gripping cut-outs 12A and 12B, as shown, trapezoidal or else semi-circular material segments of the case material which can be detached by means of perforations together with the closure strip or independently of it. A closure strip of any desired material (see below) may, for example, also be undetachably connected to both segments, so that upon opening the closure strip both segments break out with it. In both cases, the loss of originality of the protective container can be detected immediately, even better than described above, and cannot be readily restored.

Instead of the closure strip or the closure tab formed from the material of the case, a label with the same function may also be used.

The closure strip or the label may then be completely or partially self-adhesive or not self-adhesive. In the latter case, in the packing process the closure strip or the label is materially fastened by means of adhering, stapling or welding onto the perforated, non-broken-out gripping cut-out segments.

The gripping cut-outs 12A and B may also be provided in their finished form on the case 6, and closure strips or labels may be located elsewhere, as represented in FIG. 3. Closure strips or labels may be adhesively attached on the U-shape case part 9, or else they may be fixed directly on the bottom and top walls 10 and 11 of the case 6. Depending on fixing or means of fixing, such as for example an undetachable adhesive substance of the closure strip, when the protective container is opened for the first time the closure strip, or the label or the U-shape sleeve part and/or the case 6, may be irreversibly destroyed or damaged at the fastening points. The originality of the protective container may also be indicated by a band 15, cf. FIG. 4, or a thread, a cord etc.

FIG. 2A shows a configuration of a case 6 having a U-shape case part 16 with cutout 17 at the points of the gripping cut-outs 12A, 12B and the connecting strip (of the sleeve part 16) in between. A closure strip 13 is in this example a component part of the case part 16 when the latter is, in FIG. 2A, pushed partially into the case 6, represented as dashed line 28.

The closure strip 13 may also be part of a tab 29 of a case 30, as shown in FIG. 2B.

In the closed state of the case (this applies to both configurations 2A and 2B) the closure strip is fastened in the region of the gripping cut-outs 12A and 12B on the material of the container.

When the case 6 or 30 is opened, the closure strip 13 is removed, so that an incision or cutout is produced (see FIG. 2A). In this configuration, at the same time the gripping cutout segments 31A and 31B are removed along with said strip. This likewise applies in the case of FIG. 2B, but the state in which the tab 29 is completely tucked-in (29') and both gripping cut-outs 12A and 12B remain free due to the incision 32 is shown by dashed lines. In FIG. 2A, the dash-dot line 33 further indicates the possibility of pushing in the U-shape case part 16. For the sake of clarity, here the representation of the cutout 17 has been omitted.

FIG. 5 shows a laid-flat U-shape case part 18, which is provided with oblique contour lines 19, 20 and continuations 21 on the central part MT. The oblique lines 19 and 20 serve for easier insertability of the sleeve part 18 into the case and the protrusions 21 effect a better termination of the open side 7 of the case 6. The width B1 of the sleeve part 18 in turn corresponds approximately to the width B of the case 6. In principle, other contours of the case part 18 are also conceivable and usable.

FIG. 6 shows a further version of the ways of achieving the object according to the invention, which is characterized by a partially U-shaped case part 22. The case part 22 has trapezoidal protrusions 23 mating laterally the gripping cut-outs 12A and 12B of the case 6, or better still partially covering them over, and also end protrusions 26, reaching over the short sides 24 and 25 of the case 6. If the trapezoidal protrusions 23 are slightly greater than the gripping cut-outs 12A, 12B and can adhere or stick on the bottom and top walls 10, 11 of the case 6, as the end protrusions 26 can also be designed, the entire partially U-shaped case part 22 represents an originality closure for the finished cassette pack, which is represented in FIG. 6D.

Figure 6A:
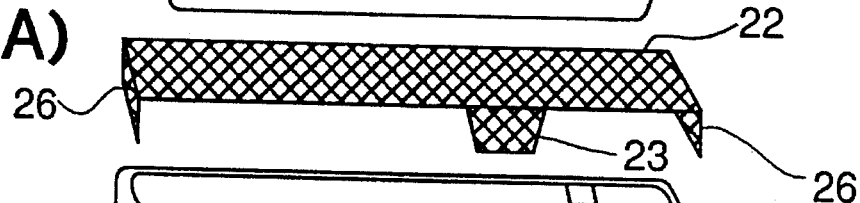
Figure 6B:
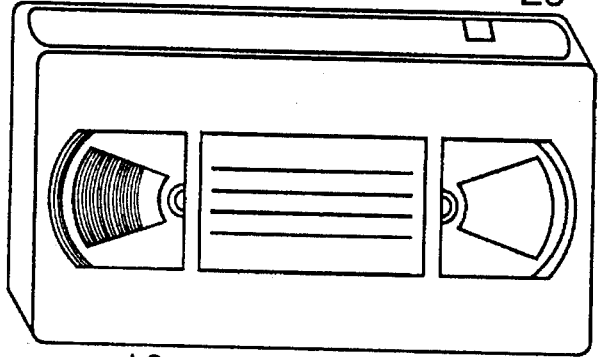
Figure 6C:
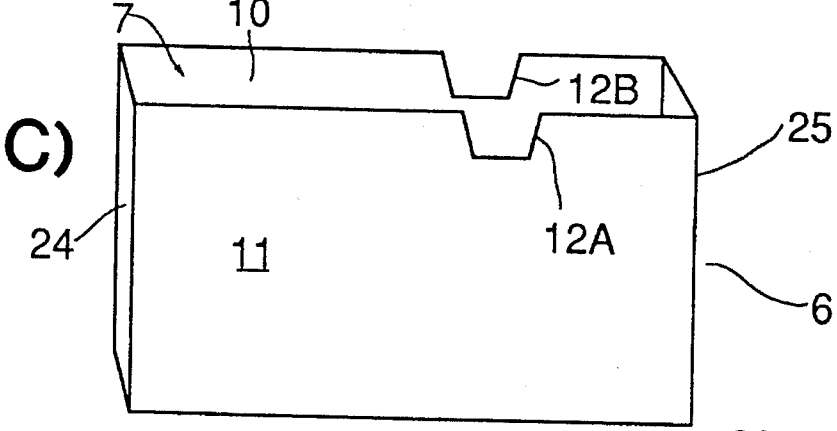
Figure 6D:
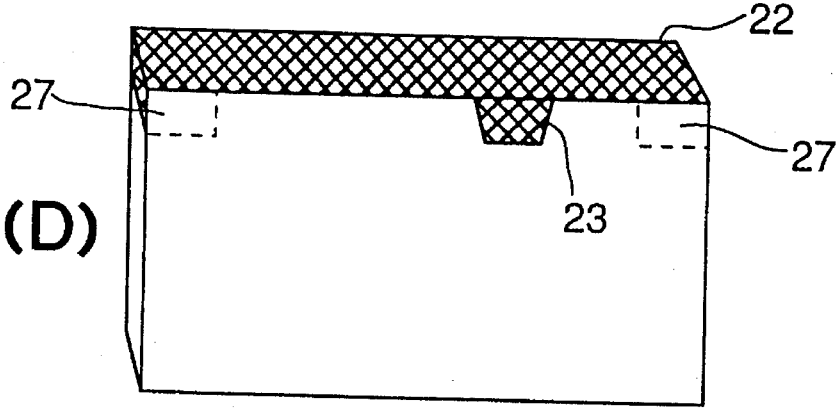

Other practical configurations for a partially U-shaped case part 22 are likewise conceivable, for example with U-shape protrusions 27 at least in the vicinity or at the upper corner regions of the protective container, as indicated in FIG. 6D by dashed lines. Such protrusions 27 may form with the end protrusions 26 a type of corner protection for the protective container or for the cassette.

Printable dispersion varnishes are understood to mean printing inks based on varnish systems. For the purposes of the present invention, it is important in this respect that the ink pigments do not contain any metal particles.

The outsides of the container or case of all the configurations described may expediently have an abrasion-resistant varnish coating, for example a UV varnish or a water-soluble and preferably chlorine-free dispersion varnish without metal fractions. With the latter, print application is particularly favorable.

An example of a suitable UV varnish is KB 7471 with Primer KB 0202 (manufactured by Knauer KG, Bieberach).

An example of a suitable dispersion varnish is KB 1380 (manufactured by Knauer KG, Bieberach).

The paper or cardboard material of the container or case, of the U-shape case part and of the closure strip may advantageously be recycled or recyclable chlorine-free material.

A protective container for substantially cuboid bodies comprises a hollow cuboid case which is open at one side and a case part covering the open side, which case part is, at least in this position, substantially U-shaped in cross-section but may also have a partially U-shape cross-section. Originality closure means connect the hollow cuboid case and U-shape case part and indicate the loss of originality after opening for the first time.

The protective container can be used for cassettes of all types and substantial cuboidal articles of all types.

We claim:

1. A protective container for a tape cassette of substantially cuboidal shape comprising a case of cuboid shape, which has an open side for pushing in and taking out the tape cassette and bottom and top walls as well as long and short side walls, the open side of the case having a length and being covered by means of a separate case part, which separate case part is made of foldable material and has an at least partially U-shaped cross-section over the full length of the open side of the case, said bottom and top walls of the case being provided with gripping cut-outs adjacent to the open side of the case, and the protective container being provided with a closure strip which partially transverses the length of said open side of the case with said separate case part therein, so as to connect the bottom and top walls of the case and the separate case part to each other in order to further provide a positive indication of whether or not the container has been previously opened, said separate case part having a folded-open width which approximately corresponds to the width of either the bottom or top wall of the case, said separate case part in folded-open form providing an insert-sheet between the tape cassette and the bottom and top walls of the case for documentation of the content of the tape cassette, and the closure strip being a part which can be separated by means of a perforation at either the bottom or top wall of the case.

2. A protective container for a tape cassette of substantially cuboidal shape comprising a case of cuboid shape, which has an open side for pushing in and taking out the tape cassette and bottom and top walls as well as long and short side walls, the open side of the case having a length and being covered by means of a separate case part, which separate case part is made of foldable material and has an at least partially U-shaped cross-section over the full length of the open side of the case, said bottom and top walls of the case being provided with gripping cut-outs adjacent to the open side of the case, and the protective container being provided with a closure strip which partially transverses the length of said open side of the case with said separate case part therein, so as to connect the bottom and top walls of the case and the separate case part to each other in order to further provide a positive indication of whether or not the container has been previously opened, said separate case part having a folded-open width which approximately corresponds to the width of either the bottom or top wall of the case, said separate case part in folded-open form providing an insert-sheet between the tape cassette and the bottom and top walls of the case for documentation of the content of the tape cassette, and the closure strip having a perforated predetermined separating line in the shape of a gripping cut-out along the top wall and the bottom wall.

3. A protective container for a tape cassette of substantially cuboidal shape comprising a case of cuboid shape, which has an open side for pushing in and taking out the tape cassette and bottom and top walls as well as long and short side walls, the open side of the case being covered and closed by means of a separate case part which has an at least partially U-shaped cross-section, said bottom and top walls being provided with gripping cut-outs adjacent to the open side of the case, wherein the separate case part is in the form of a closure strip having ends, for the open side of the case, said closure strip having lateral protrusions for closing the gripping cut-outs in the bottom and top walls and possessing at its ends protrusions for being fastened on the short side walls of the case.

4. A protective container for a tape cassette of substantially cuboidal shape comprising a case of cuboid shape, which has an open side for pushing in and taking out the tape cassette and bottom and top walls as well as long and short side walls, the open side of the case being covered and closed by means of a separate case part which has an at least partially U-shaped cross-section, said bottom and top walls being provided with gripping cut-outs adjacent to the open side of the case, wherein the separate case part is in the form of a closure strip having ends, for the open side of the case, said closure strip having lateral protrusions for closing the gripping cut-outs in the bottom and top walls and possessing at its ends further lateral protrusions for being fastened on the bottom and top walls of the case.

* * * * *